United States Patent [19]

Wu

[11] Patent Number: 4,637,091
[45] Date of Patent: Jan. 20, 1987

[54] WIPER ARM ASSEMBLY AND SYSTEM UTILIZING SAME

[75] Inventor: Leonard L. Wu, Livonia, Mich.

[73] Assignee: American Motors Corporation, Detroit, Mich.

[21] Appl. No.: 749,528

[22] Filed: Jun. 27, 1985

[51] Int. Cl.[4] ............................................. B60S 1/34
[52] U.S. Cl. .............................. 15/250.34; 15/250.16; 403/93
[58] Field of Search ........... 15/250.16, 250.17, 250.31, 15/250.34, 250.19, 250.35; 403/93

[56] References Cited

U.S. PATENT DOCUMENTS

| 2,836,841 | 6/1958 | Oishei et al. | 15/250.16 |
|---|---|---|---|
| 2,979,352 | 4/1961 | Anderson | 15/250.34 X |
| 3,126,569 | 3/1964 | Scott et al. | 15/250.16 X |
| 4,009,901 | 3/1977 | Barbee | 15/250.16 X |

Primary Examiner—Peter Feldman
Attorney, Agent, or Firm—Brooks & Kushman

[57] ABSTRACT

A wiper arm assembly and system utilizing same is disclosed wherein a wiper arm of the assembly is alternately coupled to a wiper arm driver in first and second angular positions angularly spaced about a pivot axis to permit movement of the assembly to a park position and automatic movement between first and second limit positions of a glass wipe pattern. A manually operable coupling mechanism permits the movement and automatically locks the wiper arm to the wiper arm driver in the first angular position during movement towards the first limit position immediately after movement from the park position towards the second limit position. The coupling mechanism includes a locking member and a cam having first and second communicating grooves in which the locking member is alternately positioned. The cam is mounted on the wiper arm driver to rotate about the pivot axis. A manually operable portion of the locking member extends through a hole formed in the outer surface of the wiper arm to permit movement of the locking member between a locking position and a release position against the biasing action of a spring to allow relative angular movement between the wiper arm and the cam.

15 Claims, 5 Drawing Figures

WIPER ARM ASSEMBLY AND SYSTEM UTILIZING SAME

TECHNICAL FIELD

This invention relates to wiper arm assemblies and systems utilizing same and, in particular, to wiper arm assemblies and systems having window wipers which are movable off the window glass.

BACKGROUND ART

A number of automobiles now provide wipers for rear windows where the rear window has a tendency to become deposited with contaminants and rain water that obscure the rear field of vision. These wipers are in many respects similar to conventional front windshield wipers in operation.

More specifically, a conventional window wiper typically has at least one pivotal wiper arm fitted with a rubber blade to effect a squeegee action when the wiper arm is pivoted through a wipe pattern across the window. The wiper arm begins at rest from a park position on the edge of the glass boundary of the window and intially traverses a park stroke to enter a reciprocating, pivotal motion through the wipe pattern. The wiper concludes its operation by traversing the park stroke in the opposite direction and returning to the park position. This sequence of motion is governed by a wiper motor and transmission which are conventional in the art.

It is often desirable to remove the wiper blade from the glass pane of the window during the park stroke. It is necessary to remove the wiper blade from the glass pane when the vehicle window is of the drop glass type, i.e. where the glass may be retracted within the body or door panel of the vehicle to open the window and may be extended into the window opening to close the window. This type of window must be fitted with a wiper which parks off the glass to permit window opening and closing.

It is also necessary to remove the wiper blade from the glass pane when the glass pane is included on a flip-out mechanism. In this situation, the rear window glass "flips out" from the top of the vehicle on which it is hingedly attached.

The air and liquid seal or molding which is generally provided between the window glass and frame to provide a seal between the two requires that the window glass be recessed relative to the frame. As a consequence, any wiper fitted to such a window must be capable of movement with two degrees of freedom, i.e. through the dimension of recess and through the wipe pattern of the glass surface.

It is known to provide a special inclined surface or a cam face which cooperates with the arm of a windshield wiper mechanism in such a manner that when the arm and thereby a blade thereof moves to a rest or park position the blade is lifted off the windshield to free it of stress. However, in many instances space limitations make it difficult to provide such an inclined cam face, or else require that the cam face be at a location on the vehicle which presents unacceptable problems either from a point of view of aesthetics or for operational considerations. For instance, the location must be such that the windshield wiper arm does not freeze to the cam face in cold weather conditions.

Prior patents disclose windshield wiper mechanisms which include cams which guide the wiper arms from a working position where the wiper blade contacts a window pane to a rest or park position where the wiper blade is moved away from the surface of the window pane and is disposed in an out-of-the way position relative to the window. For example, the U.S. Patent to Dunhill et al, U.S. Pat. No. 4,091,494 discloses an adjustable mounting with a pair of threaded fasteners having a guide or cam which projects outwardly from the pane of the glass. The cam functions like a ramp to guide the wiper blades through the park stroke. Likewise, the U.S. Patent to Mainka U.S. Pat. No. 3,604,048 discloses a wiper system including guide means in the form of a cooperating cam and follower to impart axial movement to the wiper arm to lift it off the windshield in a rest position.

The U.S. Patent to Palma U.S. Pat. No. 4,310,943 discloses a window cleaning system for a rear, drop glass, vehicle window, e.g. of the type on a utility station wagon. The system includes one or more wiper arms disposed on the window frame above the glass pane. Each wiper arm has a pivotal axis for rotation of the arm from a park position through a wipe pattern. The arm enters the wiper pattern through a park stroke in which the arm is brought downward and inward from the park position on the frame; the exit from the park stroke is by mutually opposite movement. Each wiper arm is guided through the park stroke by guide means as it is driven by a wiper motor. The guide means takes the form of a cam and follower arrangement. The cam is preferably formed as a projecting guide finger having a shape or configuration defining the park stroke. The follower is formed as a central offset segment of the wiper arm which engages and is guided by the projecting guide finger. Specifically, the finger guides the travel of the wiper arm through the park stroke in both transverse axes of travel, i.e. vertically and horizontally.

Other wiper mechanisms generally of the type to which this invention relates are disclosed by the U.S. Patent of Rappl U.S. Pat. No. 2,284,844, Forbush et al U.S. Pat. No. 3,112,510; Trzebinski U.S. Pat. No. 3,224,026; Scinta U.S. Pat. No. 3,452,384; Druseikis U.S. Pat. No. 3,415,132; Omlie et al U.S. Pat. No. 3,505,702; Sargent et al U.S. Pat. No. 3,545,027, Skahill U.S. Pat. No. 4,266,315; Carpenter et al U.S. Pat. No. 3,107,383; Burke U.S. Pat. No. 1,787,894; Oishei U.S. Pat. No. 1,826,672; Oishei U.S. Pat. No. 1,937,160; Dangler U.S. Pat. No. 3,110,920 and O'Steen U.S. Pat. No. 4,040,141.

DISCLOSURE OF THE INVENTION

An object of the present invention is to provide an improved wiper arm assembly and window cleaning system utilizing same for a vehicle glass window which protects a wiper mechanism in a park position off the window glass.

Another object of the invention is to provide an improved wiper arm assembly and window cleaning system utilizing same which is suited especially for a glass window having a movable pane of glass.

Still another object of the invention is to provide an improved yet relatively inexpensive wiper arm assembly and window cleaning system utilizing same for a vehicle wiper mechanism which is movable off the window glass wherein the assembly and system are particularly suited for use with conventional vehicle parts such as a conventional drive motor, motor linkage, glass frame, glass, etc.

In carrying out the above objects and other objects of the present invention, a wiper arm assembly for use in a system for cleaning a glass window of a vehicle in which a pane of glass is movable between an open position and a closed position comprises wiper means adapted to be mounted on the vehicle and to be movable from a park position through a range of travel over the glass window to define a wipe pattern for wiping the glass window free of matter deposited thereon. The wiper means includes a wiper arm pivotable about a pivot axis and a wiper blade assembly secured to the wiper arm. Coupling means adapted for selectively coupling the wiper arm to a wiper arm driver of the system in first and second angular positions angularly spaced about the pivot axis permits movement of the wiper means between first and second limit positions of the wipe pattern during normal operation and to the park position.

Preferably, the coupling means includes a cam adapted to be mounted on the wiper arm driver to rotate therewith and locking means for alternately locking the wiper arm to the cam in one of the first and second angular positions.

Further in carrying out the above objects and other objects of the present invention, a window cleaning system for cleaning a vehicle glass window of the type in which a pane of glass is movable between an open position and a closed position comprises wiper means mounted on the vehicle and movable between a park position through a range of travel over the glass window to define a wipe pattern having first and second limit positions. The wiping means wipes the glass window free of matter deposited thereon. The wiper means includes a wiper arm pivotable about a pivot axis and a wiper blade assembly secured to the wiper arm. Drive means including a wiper arm driver is pivotable about the pivot axis. The drive means is mounted on the vehicle for providing a source of controlled drive power to move the wiper means along the wipe pattern. Coupling means is provided for alternately coupling the wiper arm to the wiper arm driver in first and second angular positions angularly spaced about the pivot axis to permit movement of the wiper means between the first and second limit positions during normal operations and to the park position.

Preferably, the coupling means includes locking means for automatically locking the wiper arm to the wiper arm driver after movement to the first angular position from the second angular position. The coupling means maintains the second angular position during movement along a path from the park position towards the second limit position. The coupling means permits the relative angular movement between the wiper arm and the wiper arm driver from the second angular position to the first angular position during movement of the wiper means towards the first limit position after movement out of the park position.

The advantages of the above assembly and system utilizing same are numerous. For example, the assembly and system may be utilized with conventional vehicle parts such as conventional motor linkage, glass, glass frame, etc.

The objects, features and advantages of the present invention are readily apparent from the following description of the best mode when taken in connection with the accompanying drawings.

BEST MODE FOR CARRYING OUT THE INVENTION

Figure 1:
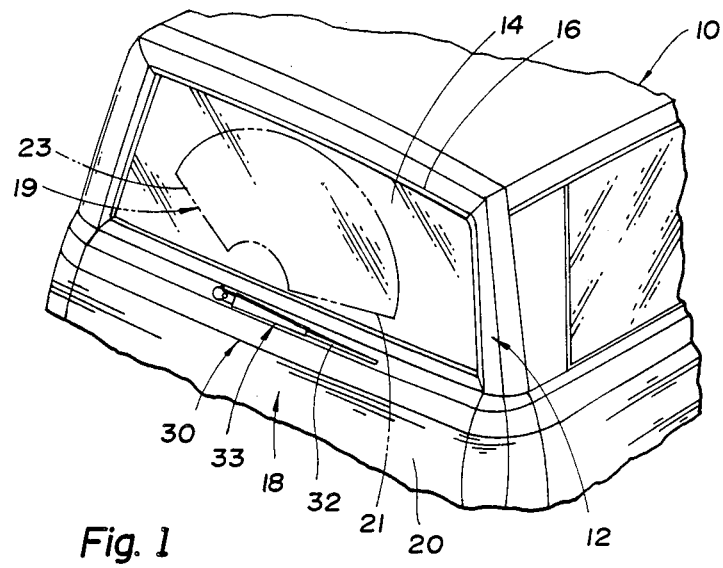
FIG. 1 is a perspective view, partially broken away, which shows a wiper arm assembly and system utilizing same for a vehicle window constructed in accordance with the invention.

Referring to the drawings, there is ilustrated in FIG. 1 the back end of a motor vehicle, generally indicated at 10. The motor vehicle 10 has a rear window, generally indicated at 12, which hingedly flips up and out. The glass window 12 includes a pane of glass 14 which is mounted within a window frame 16 to move therewith. A window wiper arm assembly, generally indicated at 18, is shown mounted on a tailgate 20 of the vehicle 10 in its park position.

Figure 2:
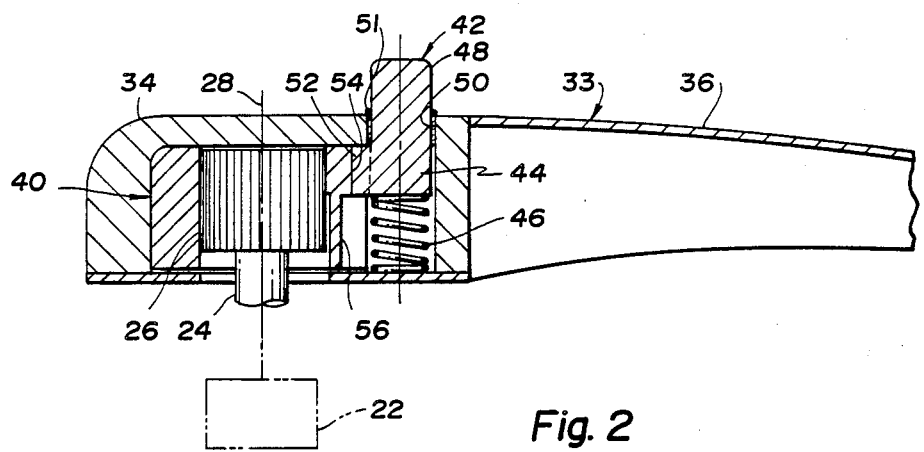
FIG. 2 is a combined schematic and side elevational view, partially broken away, and in cross-section, of a portion of the window cleaning system.

A drive mechanism including a drive subassembly schematically illustrated at 22 in FIG. 2 operates in a conventional fashion to provide motor power to drive the wiper assembly 18. Briefly, the subassembly 22 comprises a wiper motor which operates through a wiper motor transmission to drive the wiper assembly 18 through a predetermined arc or wipe pattern, generally indicated at 19, during normal window cleaning operation. As described in greater detail hereinbelow, the wiper assembly 18 is manually moved from a first limit position 21 of the wipe pattern 19 to the park position and thereafter is moved by the mechanism 22 through an additional predetermined arc from the park position toward a second limit position 23 of the wipe pattern 19. The first limit position 21 and the second limit position 23 define the extreme limits of the wipe pattern during the window cleaning operation.

The subassembly 22 also may include a drive linkage comprising a flexible cable which extends from the transmission to a drive shaft 24 of the drive mechanism. A knurled wiper arm driver 26 is mounted on the drive shaft 24 about a pivot axis 28.

The wiper arm assembly 18 includes a wiper mechanism, generally indicated at 30. The mechanism 30 includes a wiper blade assembly 32 secured at one end of a wiper arm, generally indicated at 33.

Figure 4:
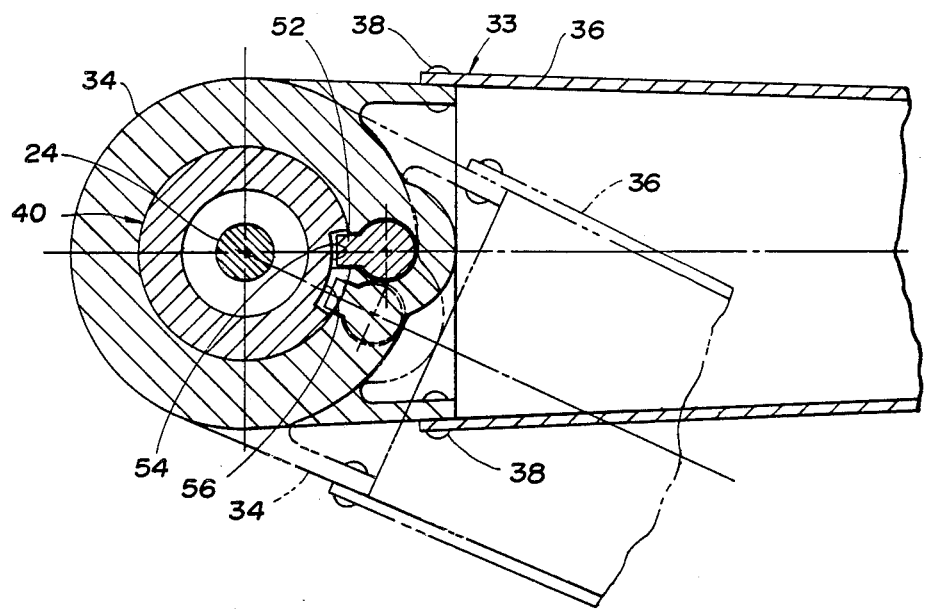
FIG. 4 is a top plan view, partially broken away and in cross-section, of the mechanism of FIG. 3 shown in two angularly spaced positions, one of which is shown by phantom lines.

The wiper arm 33 includes a hollow head subassembly 34 which is pivotally secured to an arm member 36 of the wiper arm 33 by rivets 38 in a conventional fashion as best shown in FIG. 4.

A coupling mechanism for coupling the wiper arm 33 to the wiper arm driver 26 includes a cam, generally indicated at 40, which is mounted on the wiper arm driver 26 to rotate therewith within the hollow head subassembly 34. The coupling mechanism also includes a locking mechanism, generally indicated at 42, for locking the wiper arm 33 in a first angular position with respect to the cam 40 as shown by the solid line position of the wiper arm 33 in FIG. 4.

The locking mechanism 42 includes a locking member 44 and a spring 46 which normally biases the locking member in a locking position, as best shown in FIG. 2. In the locking position, one end portion 48 of the locking member 44 extends upwardly through a hole 50 formed in the head subassembly 34. An annular seal 52 seals the hole 50 about the end portion of the locking member 44.

In the locking position of the locking member 44, a side portion 52 of the locking member 44 is disposed in a first groove 54 formed in the outer peripheral surface of the cam 40. A second groove 56 is also formed in the outer peripheral surface of the cam 40 to permit the side portion 52 of the locking member 44 to move therein when the locking member 44 is manually depressed against the biasing action of the spring 46. A retention plate 58 retains the cam 40 and the locking mechanism 42 within the head subassembly 34.

Figure 3:
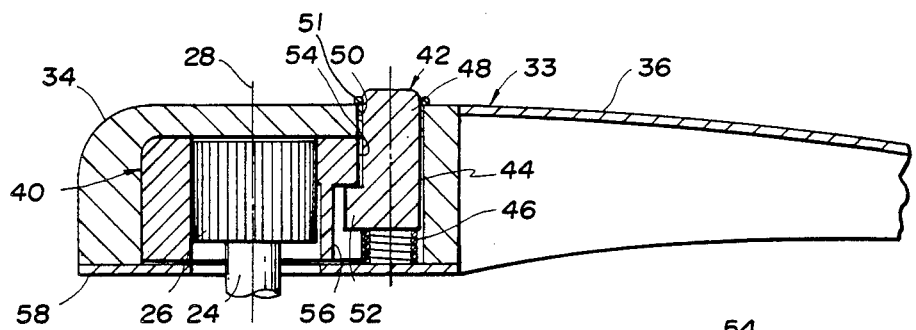
FIG. 3 is a side elevational view, partially broken away and in cross-section, of a wiper mechanism of the assembly with a manually operable locking mechanism shown in its release position.
Figure 5:
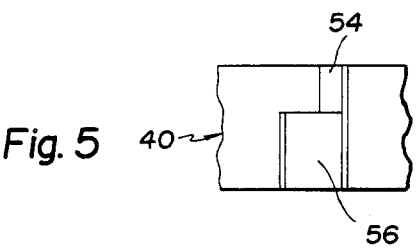
FIG. 5 is a side-elevational view of a multi-grooved cam construction for use in the wiper arm assembly.

As shown in FIG. 3, the locking member 44 is in its release position to allow manual rotation of the wiper arm 33 to its park position as illustrated by phantom lines in FIG. 4. In the park position the wiper arm 33 is in a second angular position with respect to the cam 40.

Upon actuation of the drive mechanism to cause the wiper arm driver 26 to rotate in a counterclockwise direction from the park position shown in FIGS. 1 and 4, the wiper arm 33 maintains the second angular position between itself and the cam 40 to a position adjacent the second limit position 23 of the wipe pattern 19. Subsequent rotation of the wiper driver 26 in a clockwise direction causes relative movement between the wiper arm 33 and the cam 40 until the side portion 52 of the locking member 44 is disposed immediately below the groove 54 in the cam 40. At that time the spring 46 moves the side portion 52 of the locking member 44 upwardly into the groove 54 to thereby lock the locking member 44 therein and, consequently, the cam 40 and the wiper arm 43 together.

The above-described relative movement between the wiper arm 33 and the cam 40 to the solid line position in FIG. 4 is accomplished due to the inertia of the wiper arm assembly 18 and the friction between the wiper blade assembly 32 and the glass pane 14 which produces a drag force on the wiper arm assembly 18. In this way the locking mechanism 42 automatically locks the wiper arm 33 to the cam 40 and, consequently, to the wiper arm driver 26 upon movement towards the first limit position 21 immediately after movement from the park position of the wiper mechanism 30 towards the second limit position 23.

The advantages of a wiper arm assembly and the system utilizing same as constructed above are numerous. For example, instead of redesigning many of the vehicle parts to allow a wiper blade assembly to automatically move off the pane of glass to a park position, only the wiper arm assembly need be modified. Consequently, there is no need for redesigning the drive motor, the drive linkage, the glass window or the frame of the window as previously required. Movement of the assembly to the park position may be accomplished through a simple manual operation. Subsequent energization of the drive mechanism from the park position causes the wiper arm assembly to automatically resume its normal wiping operation after the first angular position between the wiper arm driver 26 and the wiper arm 33 is reestablished.

While a preferred embodiment of a wiper arm assembly and system utilizing same have been shown and described herein in detail, those skilled in the art will recognize various alternative designs and embodiments for practicing the present invention within the scope of the following claims.

What is claimed is:

1. A window cleaning system for a vehicle having a glass window of the type in which a pane of glass is movable between an open position and a closed position, the system comprising:

wiper means mounted on the vehicle and movable from a park position through a range of travel over the glass window to define a wipe pattern having first and second limit position for wiping the glass window free of matter deposited thereon, said wiper means including a wiper arm pivotable about a pivot axis and a wiper blade assembly secured to the wiper arm;

drive means including a drive shaft pivotable about the pivot axis and a wiper arm driver fixedly mounted on a free end of said drive shaft to rotate therewith whenever the drive shaft pivots about the axis, said wiper arm driver being pivotable about the pivot axis, the drive means being mounted on the vehicle for providing a source of controlled drive power to move the wiper means along the wipe pattern; and coupling means for alternately coupling said wiper arm to said wiper arm driver in first and second angular positions angularly spaced about the pivot axis to permit movement of said wiper means between said first and second limit positions during normal operation and to the park position wherein said coupling means includes a cam releasably mounted on said wiper arm driver to rotate therewith whenever the wiper arm driver pivots about the pivot axis and locking means for alternately locking said wiper arm to said cam in one of said first and second angular positions.

2. The system as claimed in claim 1 wherein said cam has a groove formed in its outer peripheral surface and wherein said locking means includes a locking member, said locking member being disposed in said groove in said first angular position to lock said wiper arm to said cam.

3. The system as claimed in claim 3 wherein said cam has a second groove formed in its outer peripheral surface in communication with said first groove, said locking member being disposed in said second groove in said second angular position.

4. The system as claimed in claim 1 wherein said coupling means permits relative angular movement between said wiper arm and said wiper arm driver from said second angular position to said first angular position during movement of said wiper means towards said first limit position.

5. The system as claimed in claim 1 or claim 4 wherein said coupling means includes locking means for automatically locking said wiper arm to said wiper arm driver after movement to said first angular position from said second angular position.

6. The system as claimed in claim 5 wherein said locking means includes a locking member and a spring for biasing said locking member into a locking position in the first angular position.

7. The system as claimed in claim 6 wherein said locking member includes a manually operable portion extending through a hole formed in the outer surface of said wiper arm to permit movement of said locking member between the locking position and a release position against the biasing action of said spring, said locking member allowing relative angular movement between said wiper arm and said wiper arm driver in the release position of said locking member.

8. The system as claimed in claim 1 wherein the vehicle window is a rear window.

9. A wiper arm assembly for use in a system for cleaning a glass window of a vehicle in which a pane of glass is movable between an open position and a closed position, the system including a drive shaft pivotable about a pivot axis and a wiper arm driver fixedly mounted on a free end of said drive shaft to rotate therewith whenever the drive shaft pivots about the pivot axis, said wiper arm driver being pivotable about the pivot axis on the vehicle for providing a source of controlled drive power to move the assembly along a path between first and second limit positions of a wipe pattern, the assembly comprising:

wiper means adapted to be mounted on the vehicle and to be movable from a park position through a range of travel over the glass window to define a wipe pattern for wiping the glass window free of matter deposited thereon, said wiper means including a wiper arm pivotable about the pivot axis and a wiper blade assembly secured to the wiper arm; and coupling means for alternately coupling said wiper arm to the wiper arm driver in first and second angular positions angularly spaced about the pivot axis to permit movement of said wiper means between the limit positions during normal operation and to the park position wherein said coupling means includes a cam adapted to be releasably mounted on the wiper arm driver to rotate therewith whenever the wiper arm driver pivots about the pivot axis and locking means for alternately locking said wiper arm to said cam in one of said first and second angular positions.

10. The assembly as claimed in claim 9 wherein said cam has a groove formed in its outer peripheral surface and wherein said locking means includes a locking member, said locking member being disposed in said groove in said first angular position to lock said wiper arm to said cam.

11. The assembly as claimed in claim 10 wherein said cam has a second groove fromed in its outer peripheral surface in communication with said first groove, said locking member being disposed in said second groove in said second angular position.

12. The assembly as claimed in claim 9 wherein said coupling means permits relative angular movement between said wiper arm and the wiper arm driver from said second angular position to said first angular position during movement of said wiper means towards said first limit position.

13. The assembly as claimed in claim 9 or claim 14 wherein said coupling means includes a cam adapted to be mounted on the wiper arm driver to rotate therewith and locking means adapted to automatically lock said wiper arm to said cam after movement to said first angular position from said second angular position.

14. The assembly as claimed in claim 13 wherein said locking means includes a locking member and a spring for biasing said locking member into a locked position in the first angular position.

15. The assembly as claimed in claim 14 wherein said locking member includes a manually operable portion extending through a hole formed in the outer surface of said wiper arm to permit movement of said locking member between the locking position and a release position against the biasing action of said spring, said locking member allowing relative angular movement between said upper arm and said cam in the release position of said locking member.

* * * * *